UNITED STATES PATENT OFFICE.

STEFAN EPSTEIN, OF PARIS, FRANCE.

MANUFACTURE OF PHOTOGRAPHIC PLATES FOR USE IN PRINTING-PRESSES.

SPECIFICATION forming part of Letters Patent No. 717,369, dated December 30, 1902.

Application filed February 3, 1902. Serial No. 92,428. (No specimens.)

*To all whom it may concern:*

Be it known that I, STEFAN EPSTEIN, a subject of the Russian Emperor, and a resident of 78 Rue de l'Assomption, Paris, France, have invented certain new and useful Improvements in the Manufacture of Photographic Plates for Use in Printing-Presses; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

Photomechanical processes hitherto known are not suitable for use in conjunction with printing-presses, with the exception of autotype and line-engraving, which two processes have also various disadvantages, the principal of which is that satisfactory half-tones cannot be obtained, while in the case of autotype there are the additional disadvantages that pure white must be avoided and that the finer details are lost. While, therefore, attempts have been made to use photographic plates in printing-presses, these have been unsuccessful, because, on the one hand, the glass plate is not sufficiently resistant, and, on the other hand, the printing-film does not adhere sufficiently well to the glass plate.

A metal plate prepared according to this invention has the following characteristic features: First, the emulsion adheres permanently and firmly to the metal plate; second, the film on the plate is unusually tough; third, the film can be produced on the plate in any desired thickness, so that representations even in high relief and capable of being molded can be produced; fourth, the plate can be exposed beneath any ordinary photographic glass or film negative (without ruled screen.)

Metal plates according to this invention may be prepared in the following manner: The metal plate (preferably a copper one) is first roughened by any known process, and after being freed from grease and dirt is heated to a temperature of from 45° to 50° centigrade, or thereabout. An emulsion prepared as hereinafter described is then spread uniformly on the plate. The ingredients of which the emulsion is composed are preferably as follows: One hundred and twenty grams distilled water at 70° centigrade, twenty-five grams hard (photographic) gelatin, ten grams of a bichromate (preferably the bichromate of potash or ammonia) or a mixture of several bichromates, forty-five to fifty cubic centimeters alcohol, and an amount not exceeding one cubic centimeter of acetic acid. When the emulsion has been poured on the hot plate, (whose temperature at this stage is about 50° centigrade,) the plate is gradually further heated to a temperature of about 75° to 80° centigrade, for example, but not exceeding 100° centigrade, after which it is allowed to cool slowly. In the meantime, assuming that copper plates and acetic acid are both used, acetate of copper is formed between the metal plate and the emulsion and effects an intimate union of the plate and the film. When other metals than copper are used, the corresponding acid must be used to form the corresponding salt.

A plate prepared as above described is then exposed under a negative. By this treatment those places which are most strongly lighted become perfectly hard and insoluble in water, while those places which are more or less strongly lighted become more or less hard and in such condition as to swell either more or less when water is applied to the same. The plate having been exposed is now moistened by permitting water to flow over the same, whereby the parts are caused to swell, according to their capability for swelling, as described. The plate is then ready for use.

When required to be used for printing, the plate or film is moistened, preferably by impregnating it in a vacuum with glycerin as free from water as possible. It is then placed in an ordinary printing-press—as, for example, a high-speed press—and copies printed therefrom in the usual manner. The printing-ink is accepted and retained uniformly by the hardened portions, while as to those parts which are more or less swelled this is the case only in quantity corresponding to such swelling. In this manner the hard portions—that is to say, those parts strongest lighted under the negative—produce a deep black in the copy or print, while the more or less swollen portions (those parts more or less strongly lighted under the negative) produce, corresponding to the ink taken by the same, from half-tones to pure white.

The treatment of the printing-plate with glycerin and water under exclusion of air imparts to the plate such a property that it can be used for printing in a high-speed printing-press without moistening the plate after each impression, which latter operation would be required if the plate were treated with water alone instead of with glycerin and water in a vacuum. By treatment of the plate with glycerin and water under exclusion of air a highly-favorable result is obtained, inasmuch as the remoistening of the plate is only necessary after about each five hundred copies made.

By the use of the three ordinary color-plates, as well understood, the process can of course be employed for three-color printing.

Having thus described my invention, what I claim as new therein, and desire to secure by Letters Patent of the United States of America, is—

1. The process herein described of making heliotypographic plates for use in book-printing presses, which consists in roughening the surface of a plate of suitable metal, heating said plate to about 50° centigrade, covering the plate with a mixture of hot water, gelatin, a bichromate, pure alcohol, and a suitable acid, heating the plate and said mixture thereon to about 100° centigrade, permitting the plate to cool, exposing the same to light under a negative, washing the plate with water, and then treating the same with a mixture of glycerin and water, substantially as set forth.

2. The process herein described of making heliotypographic plates for use in book-printing presses, which consists in roughening the surface of a plate of suitable metal, heating said plate to about 50° centigrade, covering the plate with a mixture of hot water, gelatin, a bichromate, pure alcohol, and a suitable acid, heating the plate and said mixture thereon to about 100° centigrade, permitting the plate to cool, exposing the same to light under a negative, washing the plate with water, and then treating the same with a mixture of glycerin and water in a vacuum, substantially as set forth.

In testimony that I claim the foregoing as my invention I have signed my name in presence of two subscribing witnesses.

STEFAN EPSTEIN.

Witnesses:
MORITZ RAPPAPORT,
LEO MAASÉ.